United States Patent [19]

Baron et al.

[11] Patent Number: 4,653,864
[45] Date of Patent: Mar. 31, 1987

[54] LIQUID CRYSTAL MATRIX DISPLAY HAVING IMPROVED SPACERS AND METHOD OF MAKING SAME

[75] Inventors: Yair Baron, Southfield; Meera Vijan, Troy, both of Mich.

[73] Assignee: Ovonic Imaging Systems, Inc., Troy, Mich.

[21] Appl. No.: 834,084

[22] Filed: Feb. 26, 1986

[51] Int. Cl.⁴ .............................................. G02F 1/13
[52] U.S. Cl. ................................... 350/344; 350/320
[58] Field of Search ........................................ 350/344

[56] References Cited

U.S. PATENT DOCUMENTS 4,422,731 12/1983 Droguet et al. ................... 350/344
4,448,491 5/1984 Okubo ................................ 350/344

FOREIGN PATENT DOCUMENTS 0077152 4/1983 European Pat. Off. ............ 350/344
0113065 7/1984 European Pat. Off. ............ 350/344
59-222817 12/1984 Japan .................................. 350/344

Primary Examiner—John K. Corbin
Assistant Examiner—Richard F. Gallivan
Attorney, Agent, or Firm—Lawrence G. Norris; Robert S. Nolan; Richard O. Gray

[57] ABSTRACT

Light influencing displays and more particularly liquid crystal displays are disclosed which have a pair of light transmissive electrode supports which are uniformly spaced apart by a predetermined distance over the entire display area. The electrode supports are spaced apart by spacer means including a plurality of spacers arranged in a predetermined pattern between the electrode supports.

19 Claims, 5 Drawing Figures

LIQUID CRYSTAL MATRIX DISPLAY HAVING IMPROVED SPACERS AND METHOD OF MAKING SAME

FIELD OF THE INVENTION

The invention generally relates to improved light influencing displays and more particularly to liquid crystal displays of the type having a pair of transparent electrode supports which are uniformly spaced apart by a predetermined distance over the entire display area by spacer means including a plurality of spacers arranged in a predetermined pattern between the electrode supports.

BACKGROUND OF THE INVENTION

There are many applications wherein light influencing displays such as liquid crystal displays are utilized to advantage. For example, liquid crystal displays find use in digital watches, digital clocks, calculators, pocket-sized television receivers, and various forms of portable games, to name a few.

One common form of display is a twisted nematic liquid crystal display. Displays of this type generally include a pair of facing and spaced apart light transmissive electrode supports or substrates formed of glass, for example. One support carries on its inner or facing surface a first plurality of spaced apart light transmissive pixel electrodes. The other support carries on its inner or facing surface a light transmissive electrode which is common to all of the first plurality of electrodes or a second plurality of light transmissive electrodes with a respective given one facing a corresponding electrode of the first plurality of electrodes. The first plurality of electrodes together with the common electrode or second plurality of electrodes form a corresponding plurality of pixels or picture elements. Twisted nematic liquid crystal material is disposed between the pair of light transmissive electrode supports. The twisted nematic liquid crystal material includes an additive to cause the molecules of the liquid crystal material to have a continuously changing orientation or twist from one electrode to the other. Properly treated alignment layers are formed on the electrodes to promote alignment of the liquid crystal molecules near the electrode surfaces such that the major axes of the molecules are parallel to one another. With twisted nematic liquid crystal material the alignment layers are also treated such that, the axes of the liquid crystal molecules adjacent the first plurality of electrodes are displaced by a quarter turn or 90 degrees relative to the axes of the molecules adjacent the common electrode or second plurality of electrodes. This gives the nematic liquid crystal molecules a continuously changing orientation in the form of helical or twisted displacement of about 90° between the opposing electrodes. The display lastly includes a pair of polarizers on respective opposite sides of the electrode supports.

Depending on the relative alignment of the axes of the polarizers to each other and the display, when the liquid crystal material is in an unenergized state, transmission or absorption of incident light can occur. Upon the application of an electric field across the electrodes, the liquid crystal molecules are rotated into alignment with the field reversing the light transmission state of the display.

The pixels of such displays are generally arranged into M rows and N columns defining a matrix array. Each pixel is addressed using conventional "X-Y" addressing techniques which employ M+N address lines. Thus, each pixel possesses a unique X-Y location in the matrix which may be addressed by applying suitable voltages to a corresponding combination of X and Y addressing lines.

The magnitude of the voltage at which a liquid crystal pixel is switched to a different optical state is generally referred to as the threshold voltage of the liquid crystal material. In the case of large matrix arrays having many pixels, a significant level of electrical cross talk can exist in the addressing circuitry between adjacent pixels. In cases where the voltage threshold is not sufficiently sharp, the cross talk can be sufficient in some cases to energize pixels which are not intended to be addressed. As a result, active matrices have been developed to provide means for isolating each pixel to some degree from circuit cross talk for improving the electrical isolation between adjacent pixels. Such active matrices include nonlinear threshold devices such as diodes or switching devices such as transistors in series with each pixel to enhance the sharpness of the effective threshold of the liquid crystal materials.

While displays of the prior art have found commercial acceptance and applicability, they do suffer from some disadvantages. One example relates to the spacers required between the glass substrates of the displays to accurately control the thickness of the liquid crystal material disposed therebetween. Accurate and uniform control of the thickness of the liquid crystal material is desirable to obtain uniform operating threshold voltages for the pixels. Unfortunately, in the prior art, such spacers are difficult to handle and incorporate into the displays during the manufacture thereof.

In accordance with the prior art, the spacers are incorporated into the display by a technique known as dusting. The spacers are usually in the form of tiny plastic spheres, having a diameter of, for example, 6 microns, or glass cylinders or rods having a diameter of, for example, 6 microns and length of, for example, 10 to 25 microns. The plastic spheres or glass rods are applied to the substrate after the formation of the electrodes and required pixel address lines by a process known as "dusting" which includes subjecting the substrates to a diluted atmosphere of the plastic spheres or glass rods. Static charge then causes the spheres or rods to adhere to the substrate.

As can be appreciated, the above described dusting process results in the sphere or rod spacers to adhere to the substrate in a random pattern. As a result, the spacers can adhere to areas of the substrate which can prove detrimental to desired display operation. For example, the spacers can adhere to the surfaces of the electrodes and thus interfere with the uniform transmission of light through the pixels. The spacers can also adhere to address lines or active matrix devices causing at least one of two known problems. First, if a spacer is adhered to an address line or active device, which are relatively thin in dimension, the spacers can crush the address line or device when the two substrates are brought together and sealed. This can open circuit the address line or destroy the device and render the pixel associated with the crushed address line or device inoperative. Second, even if the address line or device is not crushed, because they have some finite thickness, the thickness of the address line or device will be added to the dimension of the spacers and hence, the substrates will be supported at that point by a distance greater than that desired.

In addition to the foregoing, new and improved liquid crystal materials are being developed for high-speed and low operating voltage displays. Substrate spacings of less than about 3 microns will be required for these new and improved displays. Unfortunately, sphere or rod spacers having such small dimensions are not very uniform in thickness.

SUMMARY OF THE INVENTION

The invention provides a light influencing display including a first substrate, a first plurality of pixel electrodes carried on the first substrate, a second substrate, a second plurality of pixel electrodes carried by the second substrate, a plurality of isolation devices and address lines formed on the first substrate, light influencing display material between the substrates, and spacer means for spacing the substrates apart. The spacer means include a plurality of discrete bodies of material carried by said second substrate and arranged in a predetermined pattern between the substrates. The spacer means are preferably formed of electrically insulating material softer than glass, such as a polyimide material or parylene.

The invention further provides a method of making a light influencing display. The method includes the steps of providing first and second substrates, forming a first plurality of pixel electrodes, isolation devices, and address lines on the first substrate, forming a second plurality of pixel electrodes on the second substrate, forming a plurality of spacers on at least one of the substrates in a predetermined pattern, securing the substrates together with the first plurality of electrodes facing the second plurality of electrodes and with the spacers between the substrates, and applying light influencing display material between the substrates.

Preferably, the step of forming the spacers includes applying a continuous layer of spacer material over the at least one substrate and selectively removing area portions of the layer of spacer material to leave remaining the spacers in the predetermined pattern.

DESCRIPTION OF THE PREFERRED EMBODIMENTS

Figure 1:
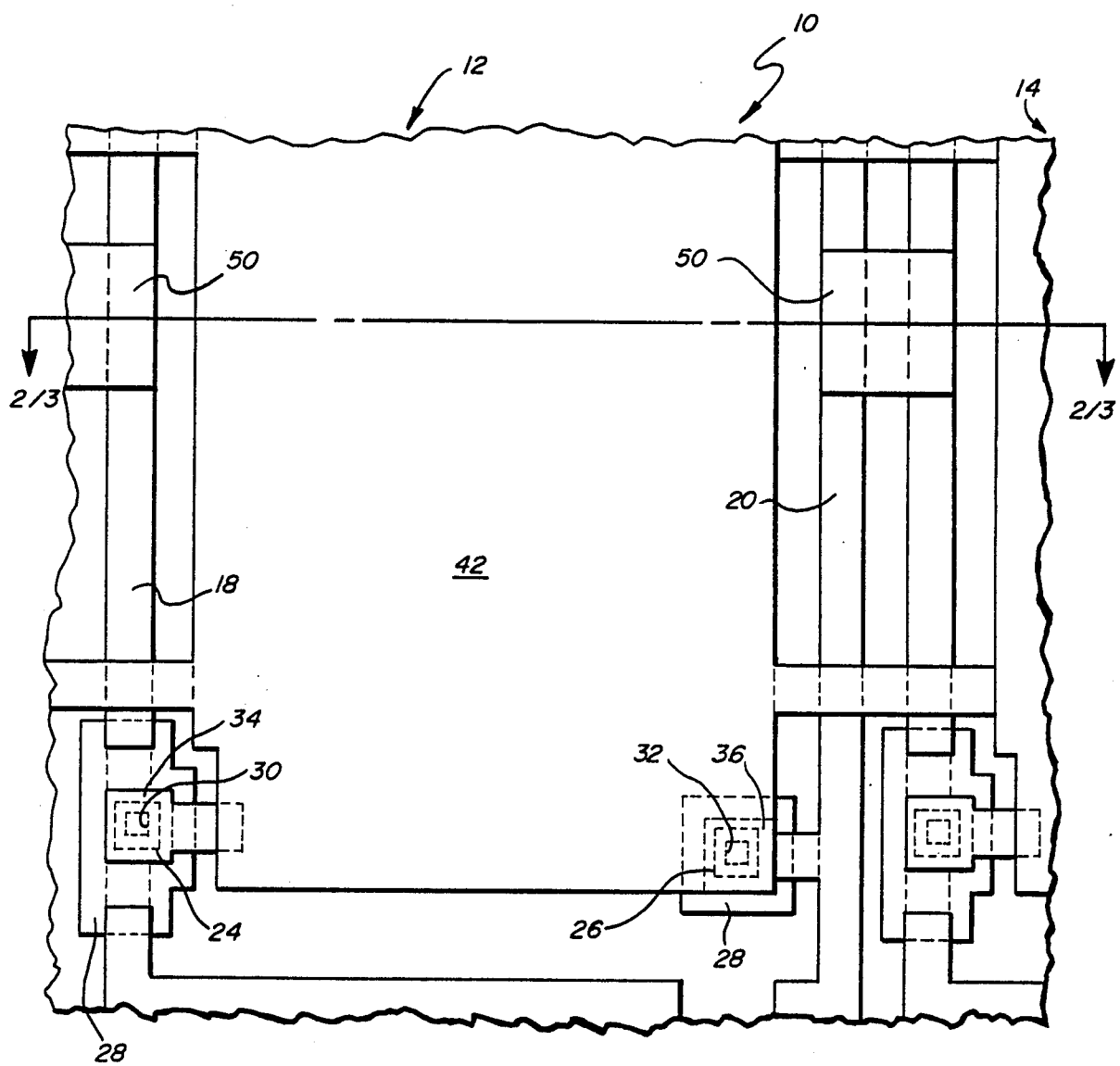
FIG. 1 is a top plan view of a light influencing display embodying the present invention.
Figure 2:
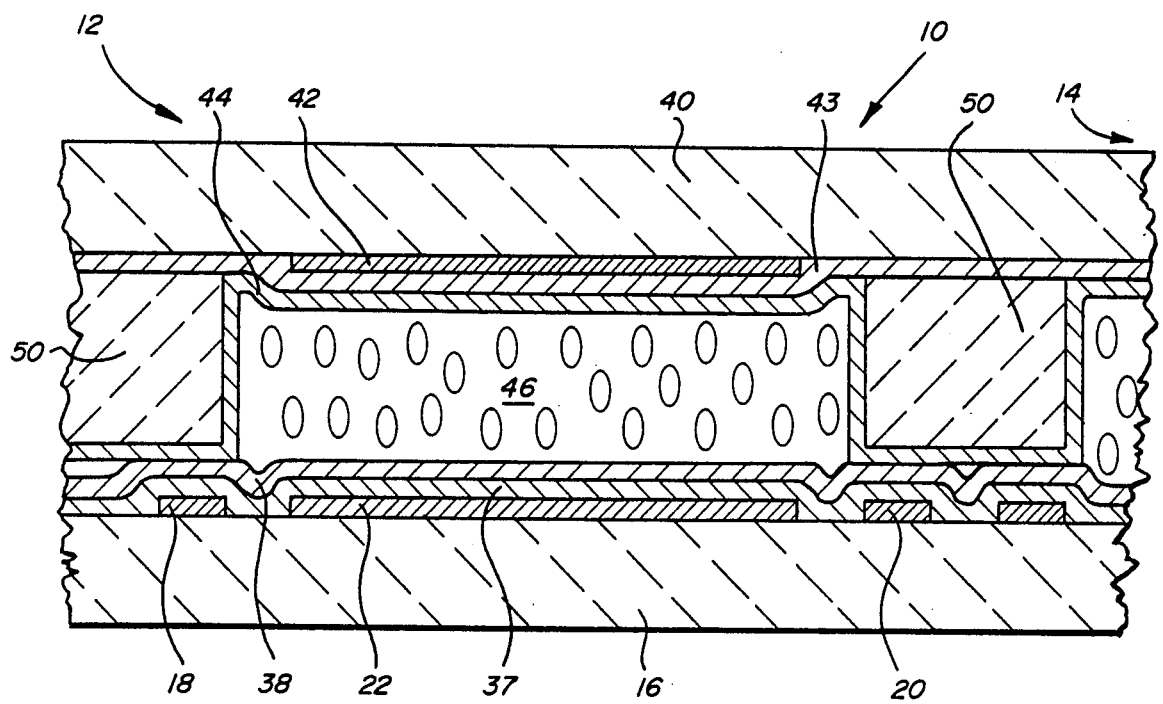
FIG. 2 is a cross-sectional side view taken along lines 2/3—2/3 of FIG. 1 illustrating a first preferred embodiment of the present invention.

Referring now to FIGS. 1 and 2, they together illustrate a light influencing display 10 structured in accordance with a first preferred embodiment of the present invention. The display 10 includes at least two pixels, pixel 12 and pixel 14. Although just two pixels are illustrated, it can be appreciated that many such pixels can be formed in, for example, a row and column arrangement to provide a complete light influencing display. As a result, the display 10 will be described with particular reference to pixel 12. It will be understood that none of the figures are drawn to scale. It will also be understood the proportionate size of some of the electronic structures may be enlarged.

The pixel 12 includes an insulative light transmissive substrate 16 which can be formed from glass, for example. Formed on the glass substrate 16 is a first address lead 18, a second address lead 20 and a first electrode 22. The first and second address leads 18 and 20 can be formed from a conductive material such as metal, for example, aluminum, molybdenum, or a molybdenum tantalum alloy. Other suitable metals are chromium, tantalum, tungsten, palladium and platinum. The address leads are formed by, for example, S-gun magnetron sputtering the metal over the entire surface area of the glass substrate 16 and then removing selected portions of the deposited metal by utilizing a mask and photolithography techniques of the type well known in the art. The first electrode 22 can be formed of a conductive light transmissive material, such as, indium tin oxide.

The pixel 12 further includes a pair of isolation devices such as diodes 24 and 26 formed on the first address lead 18 and the first electrode 22, respectively. The diodes 24 and 26 are preferably formed from a deposited semiconductor material with a top metal contact. The deposited semiconductor material is preferably an amorphous semiconductor alloy including silicon. The amorphous silicon alloy can also include hydrogen and/or fluorine and can be deposited by plasma assisted chemical vapor deposition i.e. glow discharge as disclosed, for example, in U.S. Pat. No. 4,226,898 which issued on Oct. 7, 1980 in the names of Stanford R. Ovshinsky and Arun Madan for Amorphous Semiconductors Equivalent To Crystalline Semiconductors Produced By A Glow Discharge Process. The disclosure of the '898 Patent is hereby incorporated by reference. The diodes 22 and 24 preferably have a p-i-n configuration formed by a first doped region which can be p-type, an intrinsic region overlying the first doped regions, and a second doped region which can be n-type, overlying the intrinsic regions.

The diodes 24 and 26 can be formed more specifically by depositing the previously mentioned amorphous silicon alloy regions over the entire surface area of the substrate 16 and leads 18 and 20 and the first electrode 22 and thereafter selectively etching portions of the amorphous silicon alloy regions by utilizing a suitable mask and conventional photolithography techniques. The mask utilized during the etching process preferably defines a diode configuration wherein each diode is about 20 to 50 microns on a side. Representative thicknesses for the amorphous silicon alloy regions can be, for example, 300 to 1,000 Angstroms and preferably 500 Angstroms for the p-type regions, 1,000 to 10,000 Angstroms and preferably 3,000 Angstroms for the intrinsic regions, and 100 to 500 Angstroms and preferably 200 Angstroms for the n-type regions.

Formed over the diode 24 and a portion of the address lead 18, and the diode 26 are layers of insulating material 28. The insulating material 28 can be formed from any deposited insulator such as silicon oxide ($Si_xO_y$) or silicon nitride ($Si_xN_y$), or a polyimide, for example. The configuration of the layers 28 can be obtained by coating the insulator over the entire surface area, and then exposing and developing out both of the photoresist and the insulator using a further mask. This step forms openings 30 and 32 communicating with the upper contact metal overlying the surface portions of the n-type amorphous silicon alloy regions of diodes 24 and 26 respectively, permitting interconnect leads 34 and 36 to connect the top metal of the diodes to the first electrode 22 and the second address lead 20 respectively. The interconnect leads 34 and 36 can be formed from any of the metals previously referred to and can then be configured by utilizing a suitable mask and conventional photolithography techniques. Over the structure described above is a continuous layer 37 of a light transmissive insulator such as silicon oxide ($Si_xO_y$), for example.

Over the insulator 37 is an alignment layer 38. The alignment layer or coating 38 can be of conventional type and is applied for the purpose of aligning molecules of liquid crystal material as previously described. One alignment layer material which can be used is polyimide which has been diluted before being spun on.

The pixel 12 further includes a top light transmisive substrate 40 formed from, for example, glass. On the inner surface of the substrate plate 40 is a second electrode 42 formed of transparent conductive material which can be, for example, indium tin oxide. The indium tin oxide forms a second electrode of the pixel and is configured to have the same dimension as the electrode 22 and is aligned therewith. Another light transmissive insulative layer 43 overlies the entire inner surface of substrate 40. As can be appreciated by those skilled in the art, the display disclosed herein is arranged for operating in the transmissive mode. However, as those skilled in the art will also appreciate the present invention is equally suitable for use in displays arranged to operate in the reflective mode.

As can be best noted in FIG. 2, the substrates 16 and 40 and thus the electrodes 22 and 42 are spaced apart by a predetermined distance by spacer means structured in accordance with the present invention. The spacer means include a plurality of spacers 50 which take the form of a corresponding plurality of discrete bodies of material formed over the insulator 43 and arranged in a predetermined pattern between the substrates 16 and 40. The spacers 50 are preferably formed from a material which is softer than glass, for example, polyimide or parylene material. Another alignment coating 44 of conventional type overlies the spacers 50 and the entire inner surface of substrate 40.

In between the resulting structures described above, is a layer 46 of light influencing material. By the term "light influencing material" is meant any material which emits light or can be used to selectively vary the intensity, phase, or polarization of light either being reflected from or transmitted through the material. Liquid crystal material is only one such material having these characteristics. The light influencing material 46 can be of any conventional variety, as for example, nematic liquid crystal display material, cholesteric liquid crystal display material or a mixture thereof.

The spacers 50 can be formed by first spin coating polyimide over one of the substrates, for example, substrate 40 and more particularly over the insulator layer 43. The thickness of the polyimide material can be controlled to a very accurate degree by timing a known spin coating application rate. After the polyimide is spin coated over the insulator layer 43, a layer of photoresist is applied on top of the polyimide and patterned by exposure to light through a mask. Then, both the photoresist and the polyimide are developed in the same step, since chemicals which remove uncross-linked photoresist will also remove polyimide. After this development step, the remaining photoresist is removed, leaving the polyimide spacers 50 in a predetermined pattern as best illustrated in FIG. 1.

As can be seen in FIG. 1, the spacers 50 are positioned so as to be between the top pixel electrodes 42 when the display is fully assembled. It will also be noted that the spacers 50 may be positioned so as to overlie the address lines 18 and 20. Because the spacers are formed from a relatively soft material, the address lines 18 and 20 will not be adversely affected when the bottom portion of the display including substrate 16 is brought into engagement with the spacers and sealed. As a result, a liquid crystal display is formed wherein the spacers which space the pixel electrodes apart are formed in a predetermined pattern between the pixels so as to not interfere with the light transmission therethrough and are formed of material which will not adversely effect the address lines or other components of the display. Of particular importance is the fact that the spacers do not overlie any of the matrix active devices which in accordance with this preferred embodiment.

The spacers 50 can also be patterned by using reactive ion etching. If reactive ion etching is used, the spacers are formed in the manner as described above, except that, after the polyimide has been prebaked, it is coated with an etch stop layer, such as a thin metal or oxide layer over the polyimide. The resulting layer is then coated with photoresist and the photoresist is patterned and developed. Then the etch stop layer is etched away in selected areas through the photoresist mask. The remaining photoresist is then removed and the resulting structure is subjected to a reactive ion etch to remove the polyimide in those areas which are not covered by the etch stop layer. Then the etch stop layer is removed, leaving the patterned polyimide spacers.

Once the spacers 50 shown in FIG. 2 are formed, the spacers can be baked at an elevated temperature (e.g., 350° C.) for 10 minutes. This cross-links the polyimide and makes the resulting spacers more chemically stable.

Figure 3:
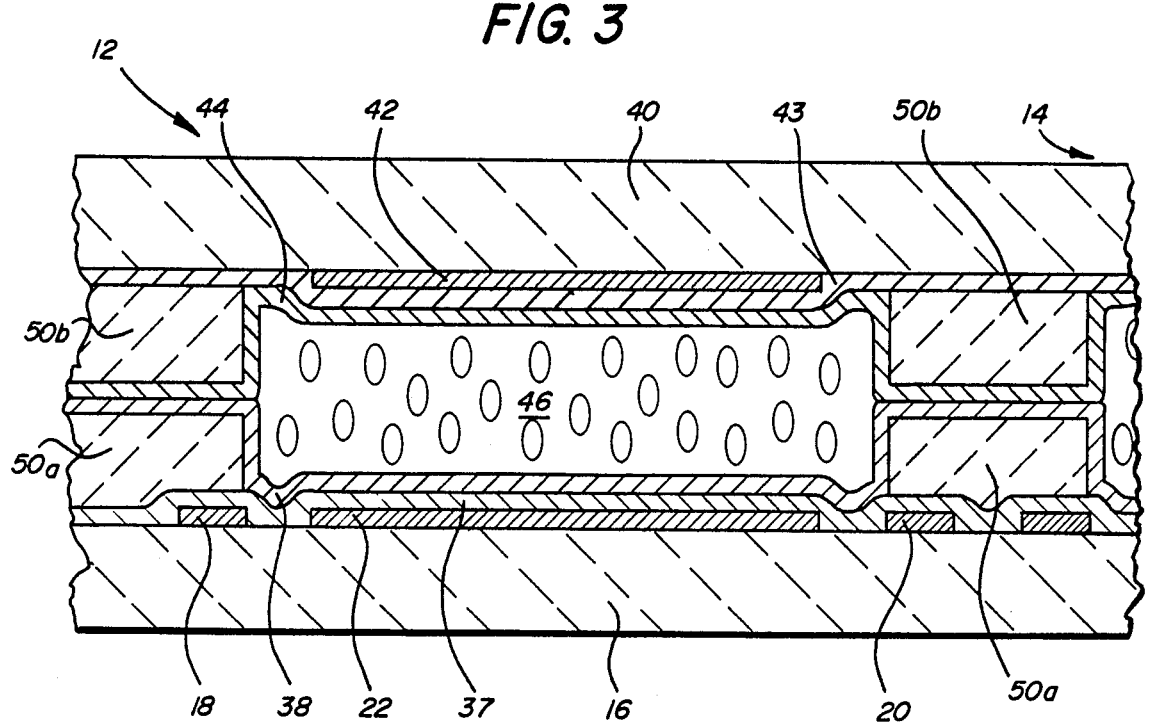
FIG. 3 is another cross-sectional side view taken along lines 2/3—2/3 of FIG. 1 illustrating a second preferred embodiment of the present invention.

Referring now to FIG. 3, it illustrates another cross-sectional side view of FIG. 1 which illustrates a second preferred embodiment of the present invention. Because the structure illustrated in FIG. 3 is essentially identical as that illustrated in FIG. 2 except for the configuration of the spacers, like reference numerals are repeated for identical elements. In FIG. 3, it can be noted that the spacers are formed on both sides of the display. To that end, spacer portions 50a are formed over the insulating layer 37 and spacer portions 50b are formed over the insulating layer 43. The spacer portions are patterned so that they will be aligned with one another when the substrates 16 and 40 are brought together during final assembly. The spacer portions 50a and 50b can be formed in the same manner as previously described with respect to the spacers 50 of FIG. 2. Formed over the spacers 50a and 50b and over the remaining surface areas between the spacers are the alignment layers 38 and 44.

By virtue of the spacers being formed on each side of the display, relatively wide spacing between the electrodes 22 and 42 is made possible. For example, if it is desired to separate the electrodes by a distance of, for example, 6 microns, each of the spacer portions 50a and 50b can be made to have a thickness of approximately 3 microns. In accordance with the embodiment of FIG. 2, the spacers 50 can have a thickness on the order of, for example, 3 microns, rendering the display thus formed suitable for use with liquid crystal materials designed for faster operation and lower operating potentials as previously described.

Figure 4:
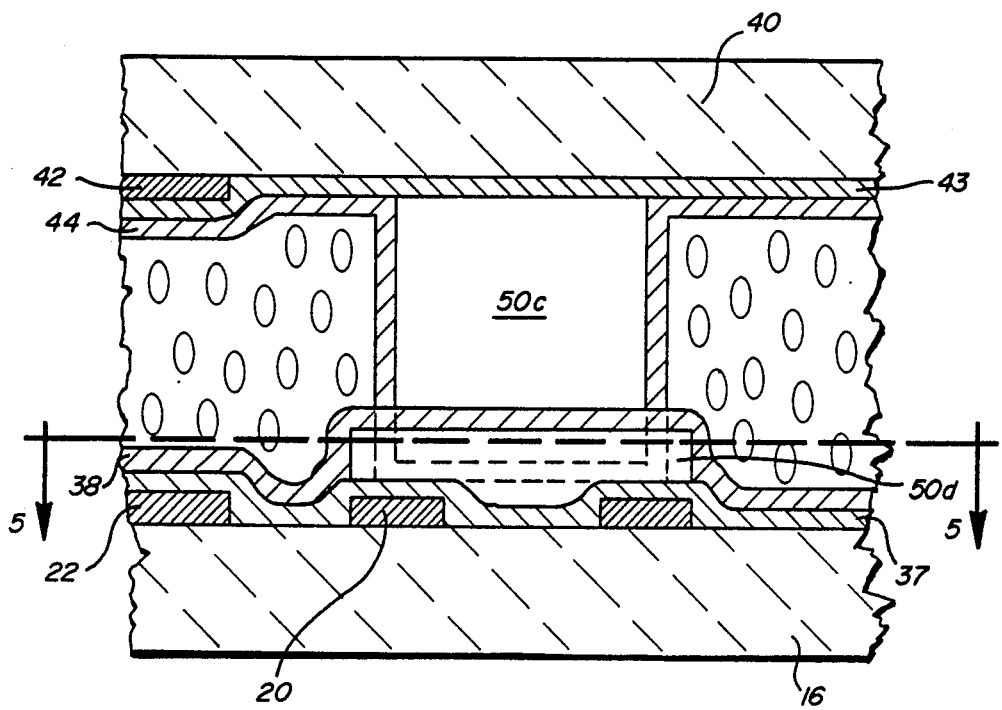
FIG. 4 is a partial cross-sectional side view illustrating a third embodiment of the present invention.
Figure 5:
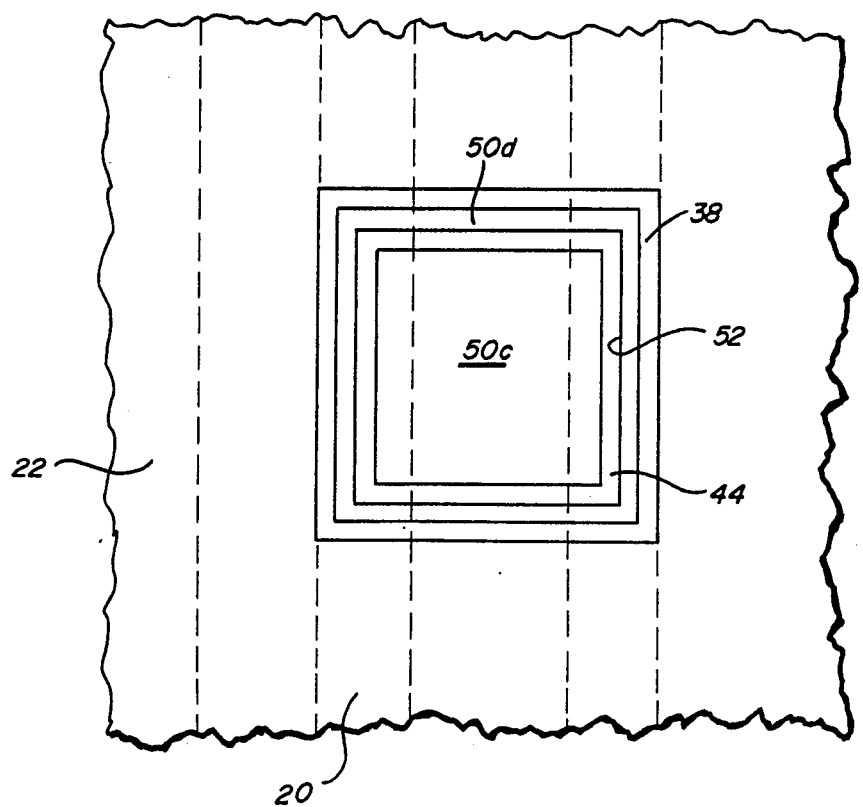
FIG. 5 is a cross-sectional side view taken along lines 5—5 of FIG. 4.

Referring now to FIG. 4, it illustrates a partial cross-sectional side view of a third preferred embodiment of the present invention. Because many of the structural components illustrated in FIG. 4 are essentially identical to those illustrated in FIGS. 2 and 3 except for the configuration of the spacers, like reference numerals are repeated for identical elements. FIG. 5 can also be referred in conjunction with FIG. 4. FIG. 5 is a cross-sectional view taken along lines 5—5 of FIG. 4. In FIG. 4, it can be noted that the spacer 50c is carried by the substrate 40. Although just one such spacer 50c is illustrated, it can be appreciated by those skilled in the art that many such spacers would be incorporated into a display. The spacer 50c is formed over the insulating layer 43. Opposite the spacer 50c, and formed on the insulating layer 37 is a spacer receiving structure 50d. The spacer receiving structure 50d has an inner cavity defined by an inner wall 52. The cavity is dimensioned in generally correspondence to the cross-sectional dimension of the spacer 50d and is arranged for receiving the spacer 50d therein. The spacer 50c and the spacer receiving structure 50d are patterned so that they will be aligned with one another when the substrates 16 and 40 are brought together during final assembly. The spacer 50c and the spacer receiving structure 50d can be formed in a manner as previously described with respect to the embodiments of FIGS. 2 and 3. Formed over the spacer 50c the spacer receiving structure 50d and the remaining surface areas are the alignment layers 38 and 44.

As can be seen from the foregoing, the spacers 50c are arranged to be received within the spacer receiving structures 50d in interlocking relation so that the substrate 16 and 40 can be positively aligned with one another upon final assembly of the display. Since the spacers 50c and the spacer receiving structures 50d can be located at predetermined locations with respect to the electrodes 42 and 22 respectively, the electrodes can be readily aligned upon final assembly. Hence, in accordance with this preferred embodiment, the spacers 50c and spacer receiving structures 40d provide for self alignment of the substrates 16 and 40 upon final assembly to align the electrodes 42 and 22 with one another.

As a result of the foregoing, it can be appreciated that the present invention provides a new and improved light influencing display and more particularly a new and improved liquid crystal display. By virtue of the improved spacers, the substrates of the display can be spaced apart with spacers distributed therebetween in a predetermined pattern so that the spacers do not interfere with the operation of the display. This avoids problems of this type associated with prior art techniques, such as dusting. Furthermore, because the spacers are formed from a relatively soft material, and more specifically, material softer than glass, even though the spacers may be formed over address lines or the like, the address lines will not be damaged when the displays are finally assembled. Furthermore, since the spacers can be formed at desired locations, incorporating the spacers over active devices such as diodes can be avoided if desired. Also, because the thickness of the spacers can be accurately controlled, this assures that the electrode pairs comprising each pixel in the display will be uniformly spaced apart, even over a large area. Accurately and uniformly controlling electrode spacing is an important part of obtaining uniform electrical and optical operating characteristics amongst the plurality of pixels, which may number into the tens or hundreds of thousands, incorporated into the displays. This is particularly important in color liquid crystal displays, wherein an inhomogeneous thickness of the liquid crystal layer amongst the pixels of a display will result in undesirable color changes to the light emanating from the display. Lastly, the spacers can be formed to have a rather large surface area compared to the surface area presented by spheres or rods. For example, the spacers can be formed to have a width and length on the order of sixty (60) microns. This provides a rather large surface area over which the pressure between the substrates can be distributed when the displays are fully assembled, which further asures uniform spacing between electrodes in each of the plurality of pixels in the displays.

We claim:

1. A light influencing display comprising:
a first substrate;
a first plurality of pixel electrodes carried on said first substrate;
a plurality of isolation devices and address lines carried on said first substrate;
a second substrate;
a second plurality of pixel electrodes carried by said second substrate;
light influencing display material between said substrates; and
spacer means for spacing said substrates apart, said spacer means being carried by said second substrate and including a plurality of discrete bodies of material arranged in a predetermined pattern.

2. A light influencing display as defined in claim 1 wherein said spacer means are formed of electrically insulating material.

3. A light influencing display as defined in claim 2 wherein said spacer means are formed of polyimide material.

4. A light influencing display as defined in claim 2 wherein said spacer means are formed of parylene material.

5. A light influencing display as defined in claim 1 wherein said light influencing display material is liquid crystal display material.

6. A light influencing display as defined in claim 1 wherein said first plurality of pixel electrodes are spaced apart on said first substrate, wherein said second plurality of pixel electrodes are spaced apart on said second substrate, and wherein said spacer means are located between the electrodes of said first plurality of pixel electrodes and between the electrodes of said second plurality of pixel electrodes.

7. A light influencing display as defined in claim 1 wherein said spacer means bodies are formed of material softer than glass.

8. A light influencing display as defined in claim 7 further including a set of address lines between said first plurality of pixel electrodes and wherein said spacer means bodies are arranged on said second substrate to overlie said address lines.

9. A light influencing display as defined in claim 1 wherein said spacer means include a first set of said bodies formed on said first substrate and a second set of said bodies formed on said second substrate, said first and second sets of bodies being aligned and disposed in abutting relation.

10. A light influencing display as defined in claim 1 further including spacer receiving means carried by said first substrate and arranged for receiving said spacer means in interlocking relation.

11. A method of making a light influencing display comprising the steps of:
 providing first and second substrates;
 forming a first plurality of pixel electrodes on said first substrate;
 forming a plurality of isolation devices and address lines on said first substrate;
 forming a second plurality of pixel electrodes on said second substrate;
 forming a plurality of spacers on said second substrate in a predetermined pattern;
 securing said substrates together with said first plurality of electrodes facing said second plurality of electrodes and with said spacers between said substrates; and
 applying light influencing display material between said substrates.

12. A method as defined in claim 11 wherein said spacers are formed of electrically insulating material.

13. A method as defined in claim 12 wherein said electrically insulating material is a polyimide.

14. A method as defined in claim 12 wherein said electrically insulating material is parylene.

15. A method as defined in claim 11 wherein said step of forming said spacers includes applying a continuous layer of spacer material over said second substrate and selectively removing area portions of said layer of spacer material to leave remaining said spacers in said predetermined pattern.

16. A method as defined in claim 15 wherein said step of removing said area portions includes etching said layer of spacer material.

17. A method as defined in claim 11 including the step of forming a plurality of said spacers on both said substrates in a predetermined pattern.

18. A method as defined in claim 17 including the step of patterning said spacers on both said substrates such that the spacers on one said substrate abut the spacers on the other said substrate when said substrates are secured together.

19. A method as defined in claim 11 including the further steps of forming a plurality of spacer receiving means on said first substrate and interlocking said spacer means with said spacer receiving means when securing said substrates together.

* * * * *